United States Patent
Shen et al.

(10) Patent No.: US 10,558,850 B2
(45) Date of Patent: Feb. 11, 2020

(54) BODY INFORMATION ANALYSIS APPARATUS AND METHOD OF SIMULATING FACE SHAPE BY USING SAME

(71) Applicant: CAL-COMP BIG DATA, INC., New Taipei (TW)

(72) Inventors: Shyh-Yong Shen, New Taipei (TW); Min-Chang Chi, New Taipei (TW); Hui-Teng Lin, New Taipei (TW); Ching-Wei Wang, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 148 days.

(21) Appl. No.: 15/870,996

(22) Filed: Jan. 14, 2018

(65) Prior Publication Data

US 2019/0122029 A1    Apr. 25, 2019

(30) Foreign Application Priority Data

Oct. 25, 2017  (CN) .......................... 2017 1 1011882

(51) Int. Cl.
*G06K 9/00* (2006.01)
*A45D 44/00* (2006.01)
(Continued)

(52) U.S. Cl.
CPC ....... *G06K 9/00275* (2013.01); *A45D 44/005* (2013.01); *G06K 9/00241* (2013.01);
(Continued)

(58) Field of Classification Search
USPC ....................................................... 382/118
See application file for complete search history.

(56) References Cited

U.S. PATENT DOCUMENTS

2009/0059030 A1* 3/2009 Hoshii .................. H04N 5/232
                                                348/222.1
2010/0141784 A1* 6/2010 Yoo ..................... H04N 5/23219
                                                348/222.1
(Continued)

FOREIGN PATENT DOCUMENTS

EP    1589476 A1    10/2005
EP    2953090 A1    12/2015
(Continued)

OTHER PUBLICATIONS

Search Report dated Oct. 22, 2018 of the corresponding European patent application.
(Continued)

*Primary Examiner* — Jerome Grant, II
(74) *Attorney, Agent, or Firm* — Chun-Ming Shih; HDLS IPR Services

(57) ABSTRACT

A body information analysis apparatus (1) and a method of simulating face shape by using same are provided. The method includes reading a predetermined value of a face shape variable from a memory (17) wherein the face shape variable corresponds to one of a plurality of target face shapes; causing an image fetching module (12) to take a picture and converting same into a digital image; causing a processing unit (10) to identify a face (6) in the digital image and position a plurality of parts of the face (6); determining an original face shape of the face (6) based on the plurality of parts thereof; performing deformation on the face (6) based on the original face shape thereof to generate a simulated face image (80) wherein a face shape variable of the simulate face image (80) complies with the predetermined value; and outputting the simulated face image (80).

12 Claims, 16 Drawing Sheets

(51) Int. Cl.
 G06T 7/73  (2017.01)
 G06T 7/149  (2017.01)
(52) U.S. Cl.
 CPC .......... G06K 9/00248 (2013.01); G06T 7/149 (2017.01); G06T 7/73 (2017.01)

(56) References Cited

U.S. PATENT DOCUMENTS

| | | | |
|---|---|---|---|
| 2014/0354760 A1* | 12/2014 | Lee | H04N 7/147 |
| | | | 348/14.1 |
| 2014/0372100 A1* | 12/2014 | Jeong | G06F 17/28 |
| | | | 704/2 |
| 2015/0145882 A1* | 5/2015 | Nguyen | H04N 1/622 |
| | | | 345/589 |
| 2016/0125227 A1 | 5/2016 | Soare et al. | |
| 2018/0276883 A1* | 9/2018 | D'Alessandro | G06T 11/60 |
| 2019/0206031 A1* | 7/2019 | Kim | G06T 5/006 |

FOREIGN PATENT DOCUMENTS

| | | |
|---|---|---|
| KR | 20040075672 A | 8/2004 |
| KR | 20040106844 A | 12/2004 |

OTHER PUBLICATIONS

Office Action dated May 27, 2019 of the corresponding Korean patent application.

* cited by examiner

BODY INFORMATION ANALYSIS APPARATUS AND METHOD OF SIMULATING FACE SHAPE BY USING SAME

BACKGROUND OF THE INVENTION

1. Technical Field

The technical field relates to body information analysis apparatuses and methods, and more particularly relates to a body information analysis apparatus and a method of simulating face shape by using same.

2. Description of Related Art

Generally speaking, face shape of a person is natural. But people may change his or her face shape by cosmetic surgery or making up by wearing decorations or applying makeup to the face shape.

For knowing what the appearance of a person will be after changing face shape, typically the person may entrust a graphic specialist to use a graphic modification software to simulate the face shape by imaging. However, above technique is not only time consuming but also expensive.

Thus, the need for a body information analysis apparatus exists. A person may use the body information analysis apparatus to generate a simulated image based on face shape of the person and a desired face shape.

SUMMARY OF THE INVENTION

The disclosure is directed to a body information analysis apparatus and a method of simulating face shape by using same for automatically generating a simulated face image for user selection as a target face shape.

It is therefore a first object of the disclosed example to, in one of the exemplary embodiments, provide a body information analysis apparatus, comprising an image fetching module for recording an external image; a display module; a memory for storing a predetermined value of a face shape variable wherein the face shape variable corresponds to a target face shape; and a processing unit electrically connected to the image fetching module, the display module, and the memory, the processing unit including a face analysis module for identifying a face in the external image recorded by the image fetching module and positioning a plurality of parts of the face; a face shape detection module for determining an original face shape of the face based on the plurality of parts of the face; a deformation main module for performing deformation on the face to generate a simulated face image based on the original face shape of the face wherein a face shape variable of the simulated face image complies with the predetermined value; and an output control module for controlling the display module to show simulated face image.

It is a second object of the disclosed example to, in one of the exemplary embodiments, provide a method of simulating face shape by using a body information analysis apparatus, comprising the steps of reading a predetermined value of a face shape variable from a memory of the body information analysis apparatus wherein the face shape variable corresponds to one of a plurality of target face shapes; causing an image fetching module to take a picture and converting same into an external image; causing a processing unit of the body information analysis apparatus to identify a face in the external image and position a plurality of parts of the face; determining an original face shape of the face based on the plurality of parts thereof; performing deformation on the face based on the original face shape thereof to generate a simulated face image wherein a face shape variable of the simulate face image complies with the predetermined value; and outputting the simulated face image.

The disclosed example has the following advantages and benefits in comparison with the related art: The disclosed example is capable of automatically generating a simulated face image for selection by performing deformation on different face shaped based on the original face shape of a user and the simulated face image is more natural.

The above and other objects, features and advantages of the disclosed example will become apparent from the following detailed description taken with the accompanying drawings.

DETAILED DESCRIPTION OF THE INVENTION

Embodiments of the disclosed example will now be described, by way of example only, with reference to the accompanying drawings.

The disclosed example discloses a body information analysis apparatus (hereinafter called analysis apparatus) 1 and a method of simulating face shape by using the analysis apparatus 1 (hereinafter called face shape simulation method). The face shape simulation method can simulate face shape of a user and show the simulated face shape on a screen of the analysis apparatus 1. Thus, the user may easily know his or her face shape after taking the simulation.

Figure 1:
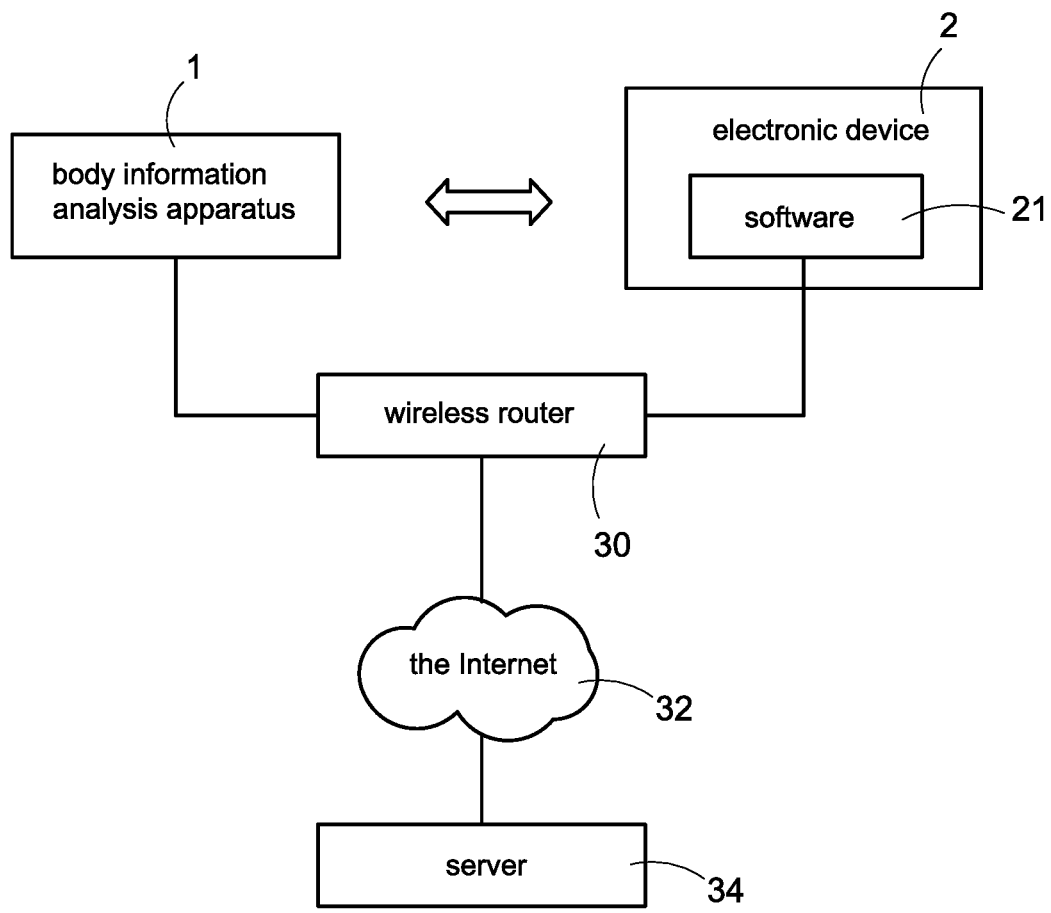
FIG. 1 is a block diagram of a system according to the disclosed example.

Referring to FIG. 1, it is a block diagram of a system according to the disclosed example. In an embodiment of FIG. 1, a user may operate an electronic device 2 to set the analysis apparatus 1.

Specifically, software 21 is stored in memory (not shown) of the electronic device 2. The software 21 (e.g., application software developed by the manufacturer of the analysis apparatus 1) is adapted to control the electronic device 2. Also, a user can perform the software 21 to cause the analysis apparatus 1 to accept user input data, show images of the user (e.g., face images), and/or set various predetermined values (e.g., predetermined values of various face shapes detailed later).

In an embodiment, the user may directly operate an input interface (e.g., an input interface 15 of FIG. 4) of the analysis apparatus 1 for setting purposes.

In an embodiment, Wi-Fi, Bluetooth, Zigbee, radio frequency (RF), infrared, optical communication, audio communication and/or any of other wireless communication techniques can be employed by a wireless transmission module (e.g., a wireless transmission module 16 of FIG. 4) of the analysis apparatus 1 for data transfer between the analysis apparatus 1 and the electronic device 2.

In an embodiment, the analysis apparatus 1 is connected to a wireless router 30 of the same area. The wireless router 30 is connected to the Internet 32. Thus, the analysis apparatus 1 may update its firmware, perform uploading and perform downloading via the Internet 32. Further, the analysis apparatus 1 may transmit body information including external images, face images and/or face shape information (as detailed later) of the user to a remote server 34 via the Internet 32. Thus, the user may view from a remote location and the purpose of remote backup of information is obtained.

Figure 2:
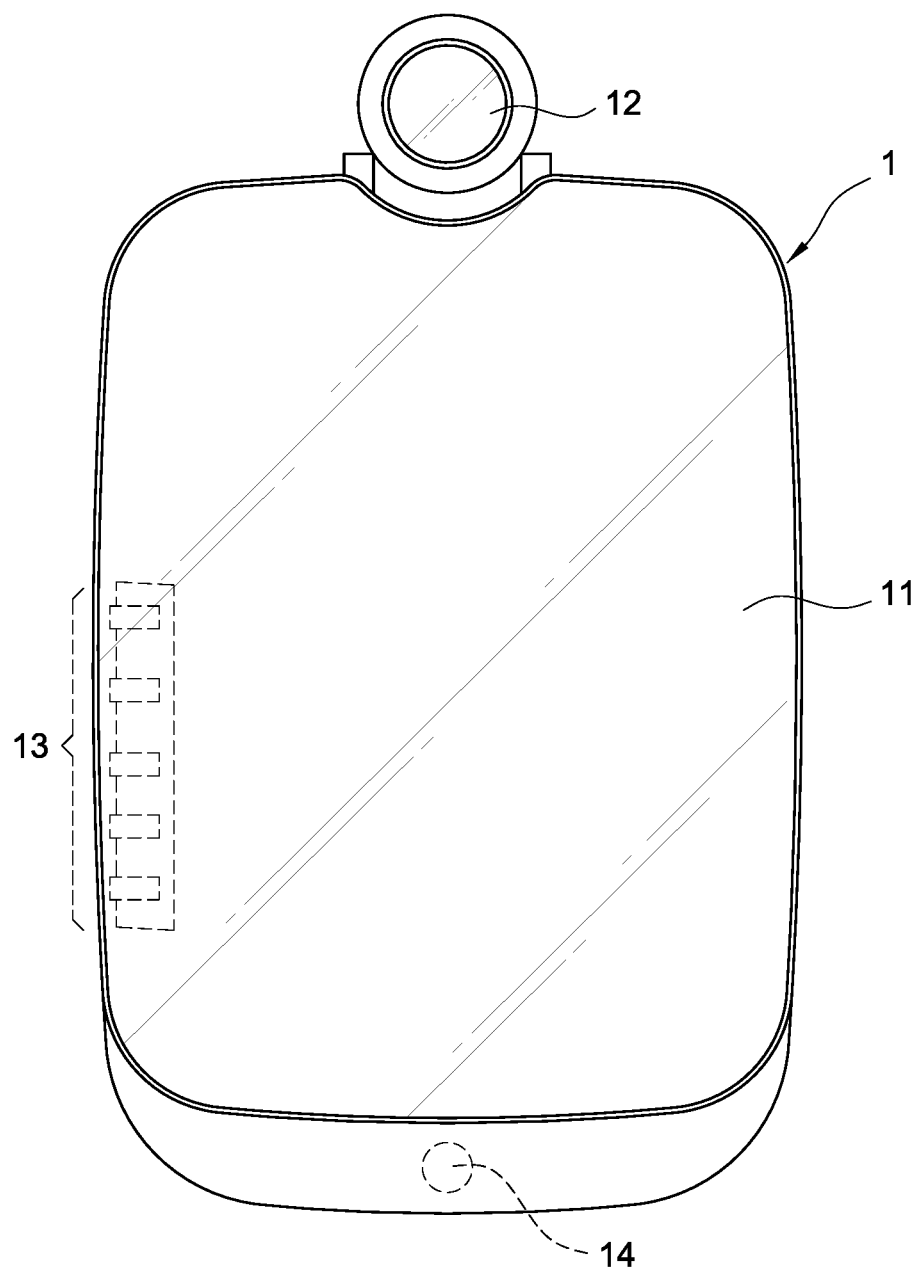
FIG. 2 is a top view of a body information analysis apparatus.
Figure 3:
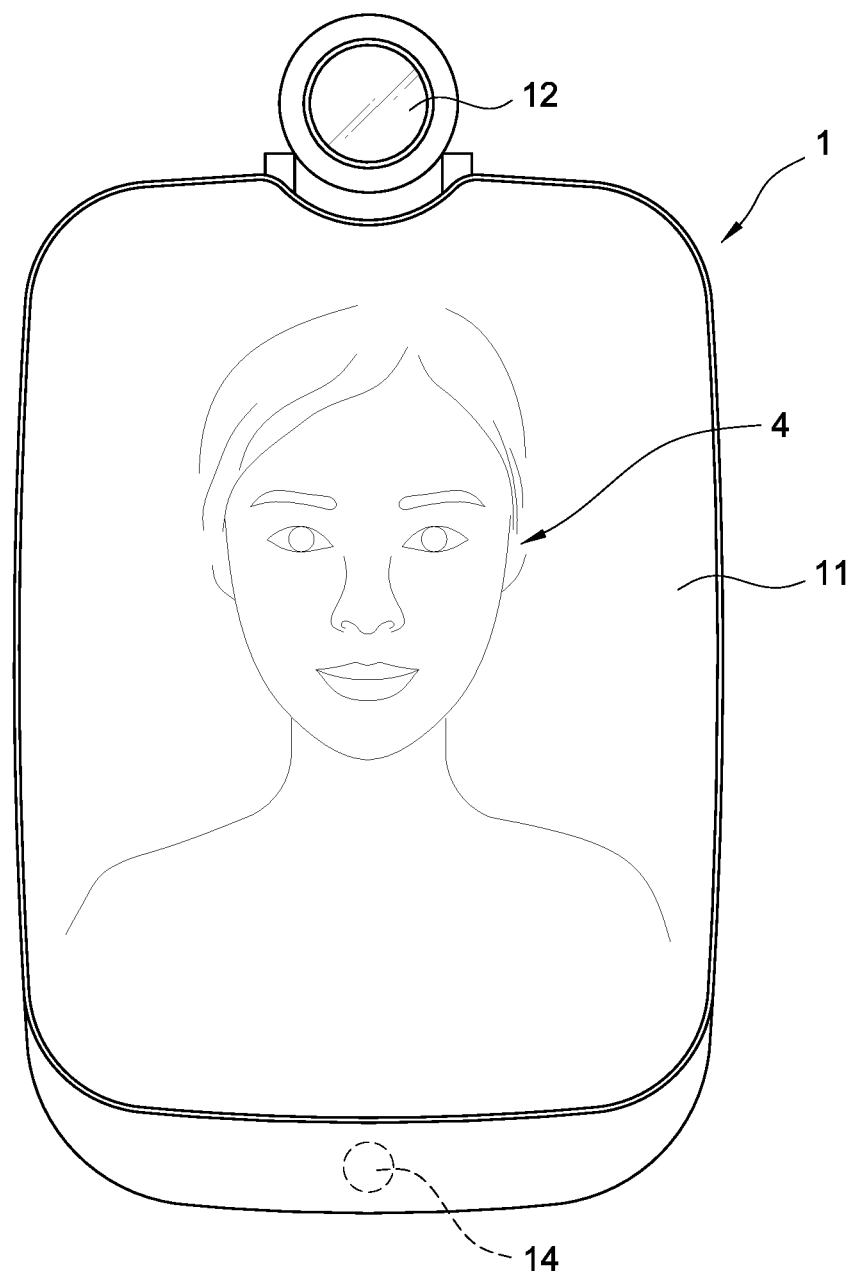
FIG. 3 is a view similar to FIG. 2 with an image shown thereon.

Referring to FIGS. 2 and 3 in which FIG. 2 is a top view of a body information analysis apparatus, and FIG. 3 is a view similar to FIG. 2 with an image shown thereon. In FIGS. 2 and 3, the analysis apparatus 1 is provided in a bedroom or bathroom so that a user may easily detect and analyze information of the body parts including the face, the neck, the hand and the skin.

The analysis apparatus 1 comprises a screen 11. After activating the analysis apparatus 1 (see FIG. 2), a graphical user interface (GUI) is shown on the screen 11 and the user may interact with the GUI. Further, after deactivating the analysis apparatus 1 (see FIG. 3), the screen 11 can be used as a mirror so that the user can see his or her image 4 in the screen 11.

The analysis apparatus 1 of the disclosed example is used to detect face shape of a user and show information of the simulated face shape for alerting the user so that the user may apply appropriate makeup. As described above, the screen 11 can be used to show the GUI or the image 4 of the user, thereby enabling the user to analyze the face shape prior to applying makeup and providing help as discussed later.

In an embodiment, the analysis apparatus 1 further comprises an image fetching module 12. The image fetching module 12 is provided on the analysis apparatus 1 and is capable of adjusting its angle with respect to the analysis apparatus 1.

In an embodiment, the image fetching module 12 can take a high-resolution picture of the body part (e.g., the face, the neck or the hand) of the user and convert same into a digital external image. The analysis apparatus 1 can analyze the body information and/or makeup progress by using the image. In another embodiment, the image fetching module 12 can fetch external information (e.g., one-dimensional (1D) barcode or two-dimensional (2D) barcode) for obtaining data therefrom.

Also, the analysis apparatus 1 sends the image obtained by the image fetching module 12 to the screen 11 for showing. Thus, the user can see his or her image 4 on the screen 11 when the analysis apparatus 1 is activated.

Further, the analysis apparatus 1 may process the image in real time by drawing face contours on the images or embedding text and graphics information and send the processed image to the screen 11 for showing.

Thus, the analysis apparatus 1 may provide additional information to the user by means of augmented reality (AR) so that the user may see his or her image on the screen 11 when applying makeup, thereby increasing extent of user experience.

In an embodiment, the screen 11 is implemented as a touchscreen and the user can give input through a simple gesture by touching the screen 11 with one or more fingers.

The analysis apparatus 1 further comprises a plurality of keys 13. In the embodiment, the keys 13 are implemented as buttons or touch keys in a non-limiting manner. The user may press the key 13 to operate the GUI (e.g., activating the GUI to return to homepage, previous page, or next page), or cause the analysis apparatus 1 to perform a corresponding function (e.g., activating the screen 11, deactivating the screen 11, or activating the image fetching module 12).

The analysis apparatus 1 further comprises one or more sensors (e.g., thermometer and hygrometer) 14 for sensing environment conditions of the analysis apparatus 1. By utilizing the analysis apparatus 1, accuracy of simulation and analysis of the body image of the user can be greatly increased. In an embodiment, the sensor 14 is a motion sensor so that the analysis apparatus 1 may activate the motion sensor 14 to sense the gesture (e.g., moving leftward, moving rightward, moving upward, moving downward, moving forward, or moving rearward) of the user. In such a manner, the user may give input to the analysis apparatus 1 by a gesture without touching the screen 11 or pressing the key 13. This has the benefit of leaving no fingerprints.

Figure 4:
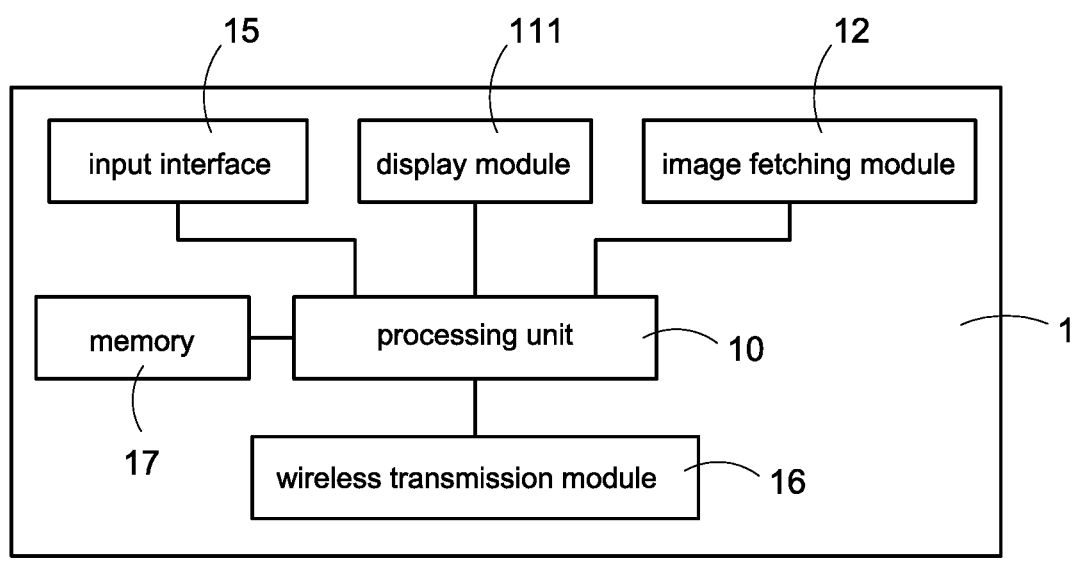
FIG. 4 is a block diagram of the body information analysis apparatus.

Referring to FIG. 4, it is a block diagram of the analysis apparatus 1. In FIG. 4, the analysis apparatus 1 comprises a display module 111, an image fetching module 12, an input interface 15, a wireless transmission module 16, a memory 17, and a processing unit 10 electrically connected to all of the above components.

In an embodiment, the image fetching module 12 is a camera or movie camera for capturing images (e.g., the face of a user) and recording external information. The analysis apparatus 1 may analyze the images to identify the body parts such as face identification, neck identification or hand identification. As a result, the face, the neck or the hand of the user can be analyzed. Alternatively, corresponding actions are performed based on the external information.

The display module 111 is used to show the GUI. In an embodiment, the display module 111 is disposed in the screen 11. In response to activating the display module 111, light of the display module 111 passes through the one-way light penetration glass (not shown) of the screen 11 to be simulated by the eyes of the user. Thus, the user may see the GUI on the screen 11. In response to deactivating the display module 111, the user only can see his or her image 4 on the screen 11 due to the nature of the one-way light penetration glass. In an embodiment, the analysis apparatus 1 may adjust light intensity or display areas of the display module 111 so that the screen 11 may show the GUI while reflecting the image 4 of the user.

The analysis apparatus 1 receives user input via the input interface 15 so that the user may interact with the GUI or perform setting. In an embodiment, the input interface 15 is the sensor 15 for sensing user gestures input. In another embodiment, the input interface 15 is an image fetching module 12 for capturing images and recording external information. In yet another embodiment, the input interface 15 is a touchscreen or the key 13 for receiving user input. In a further embodiment, the input interface 15 is a microphone for converting sound into an electrical signal.

The wireless transmission module 16 functions to connect to the Internet 32. Specifically, the user accesses the analysis apparatus 1 via the Internet 32 for viewing information (e.g., body information) recorded by the analysis apparatus 1.

The memory 17 functions to store data. In an embodiment, the memory 17 comprises a database 170 for storing data (e.g., body information of the user, voice instructions issued by the analysis apparatus 1, information of cosmetics owned by the user, video clips for teaching how to apply makeup, and/or information of face shape discussed later).

The processing unit 10 is connected to the display module 111, the image fetching module 12, the input interface 15, the wireless transmission module 16 and the memory 17. The memory (not a volatile memory) 17 stores computer executable codes (not shown). The processing unit 10 can carry out the face shape simulation method by executing the computer executable codes.

Figure 5:
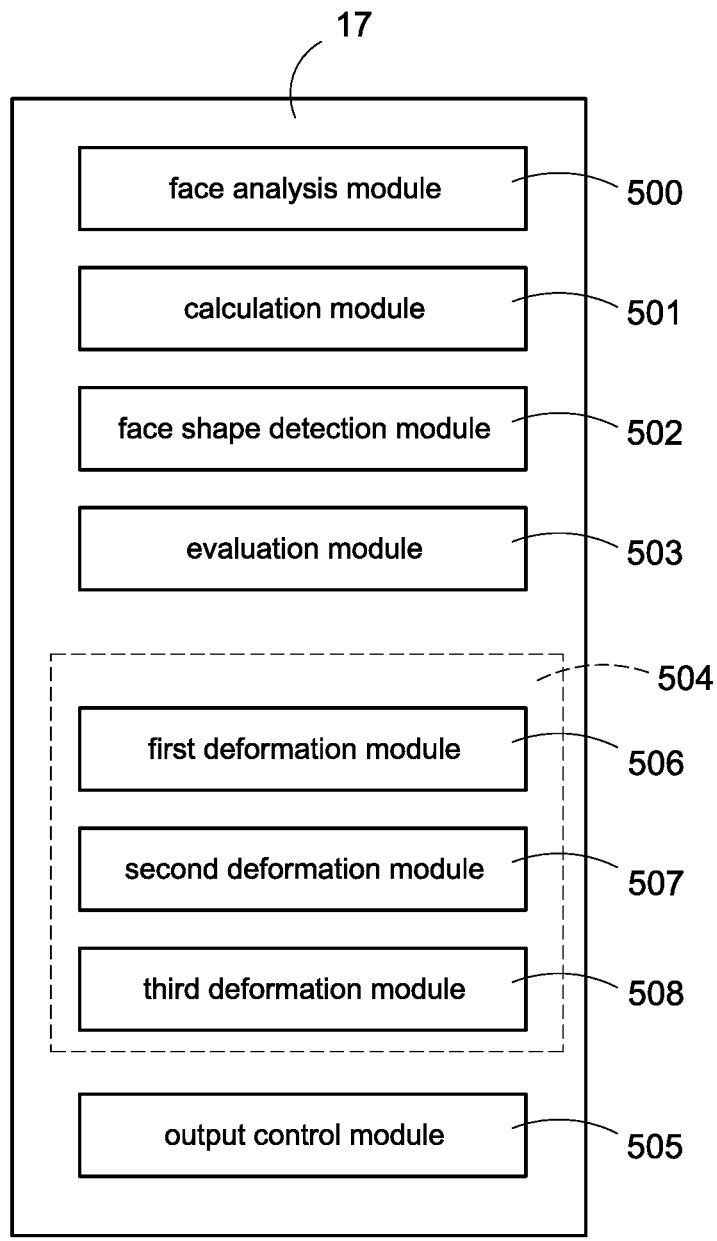
FIG. 5 is a block diagram of the memory.

Referring to FIG. 5, it is a block diagram of the processing unit 10. Specifically, the computer executable codes include a plurality of program codes each corresponding to a different module. The processing unit 10 can carry out the face shape simulation method of the disclosed example by executing the computer executable codes. The computer executable codes can be classified into the following modules: A face analysis module 500, a calculation module 501, a face shape detection module 502, an evaluation module 503, a deformation main module 504 including a first deformation module 506, a second deformation module 507, and a third deformation module 508, and an output control module 505.

The face analysis module 500 is used to identify the face in the image fetched by the image fetching module 12 and position portions of the identified face. Specifically, the face analysis module 500 can identify the face in the image (e.g., the face 6 of FIGS. 11 to 13).

Figure 11:
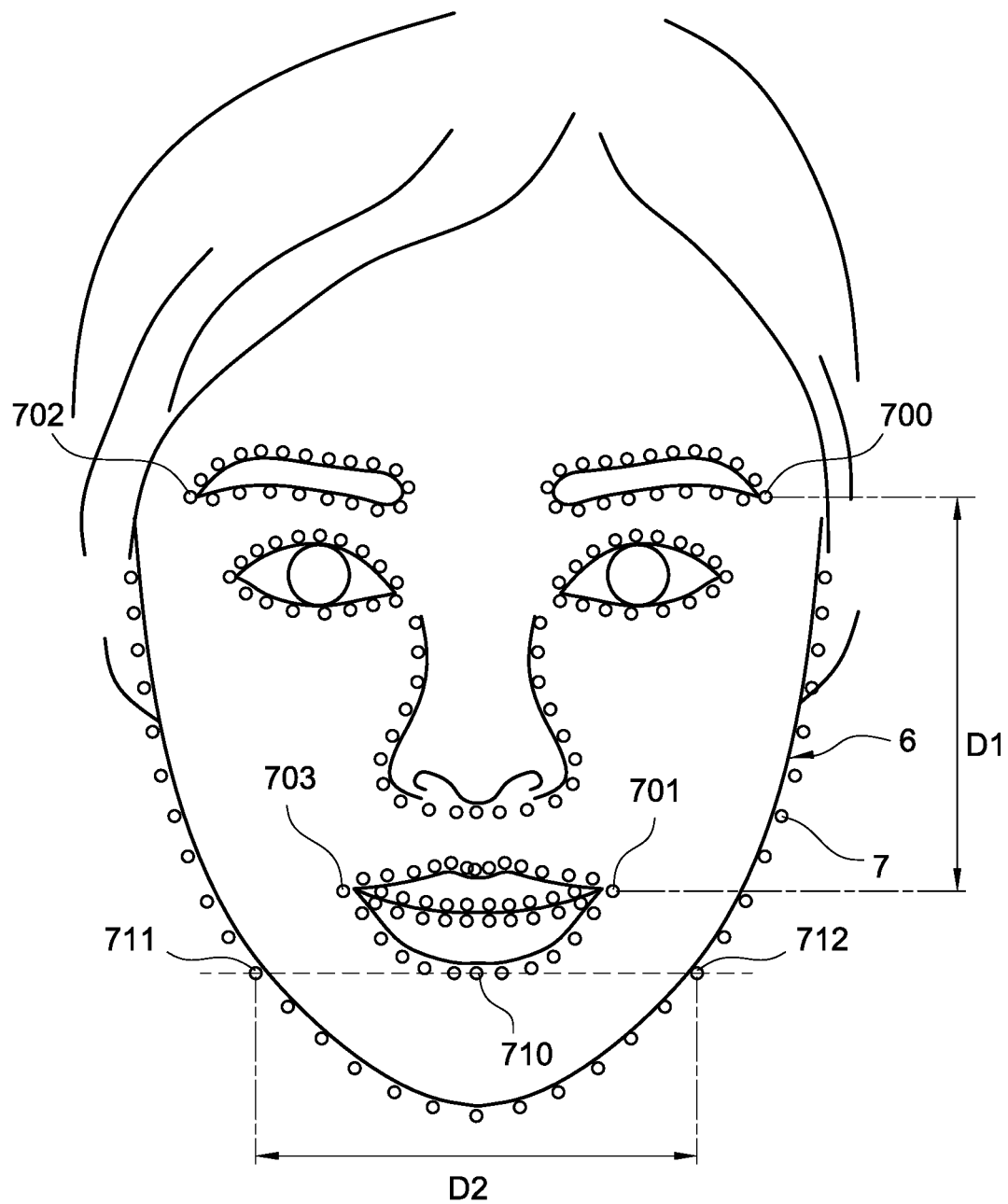
FIG. 11 schematically calculates a first face shape variable.
Figure 12:
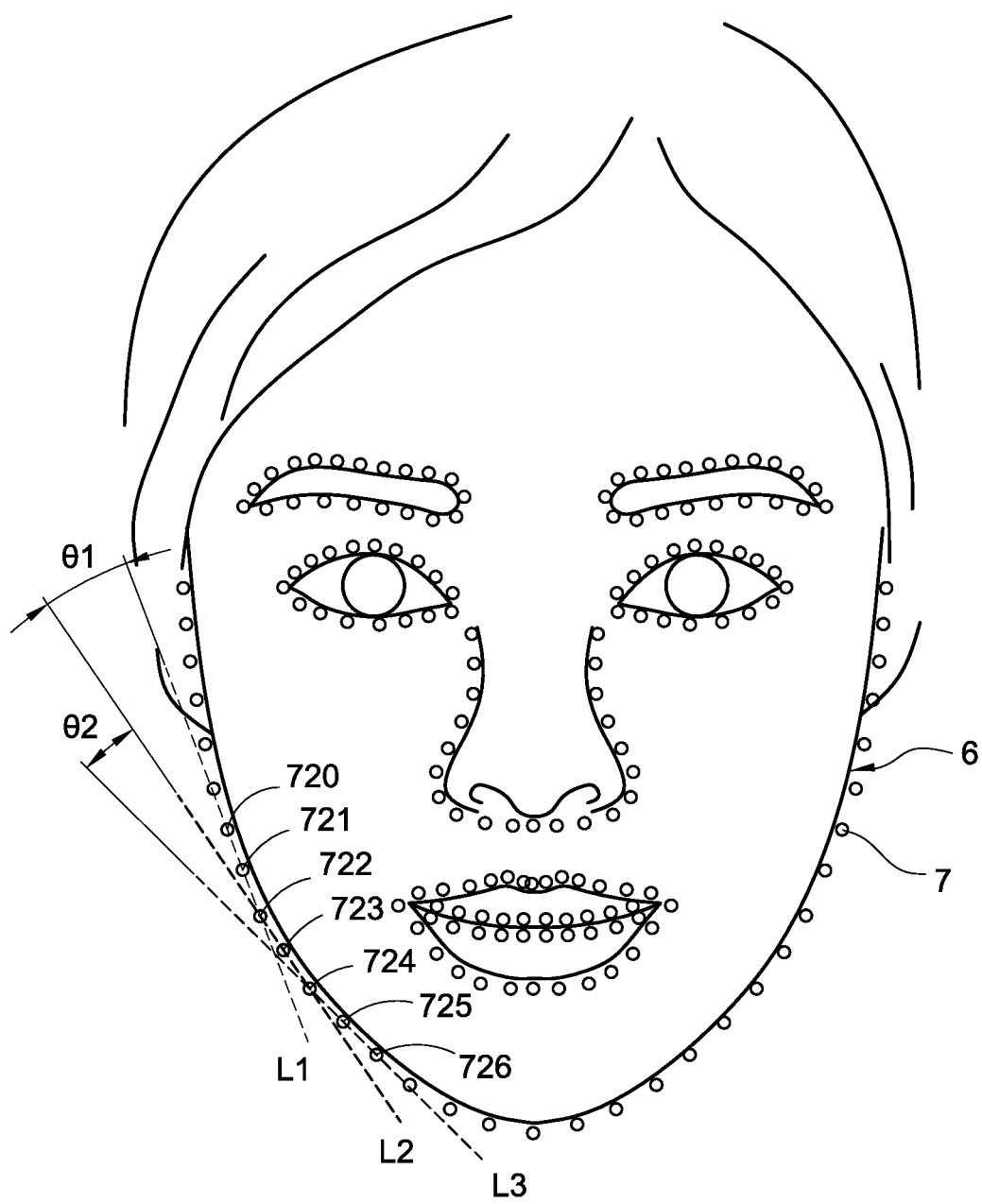
FIG. 12 schematically calculates a second face shape variable.
Figure 13:
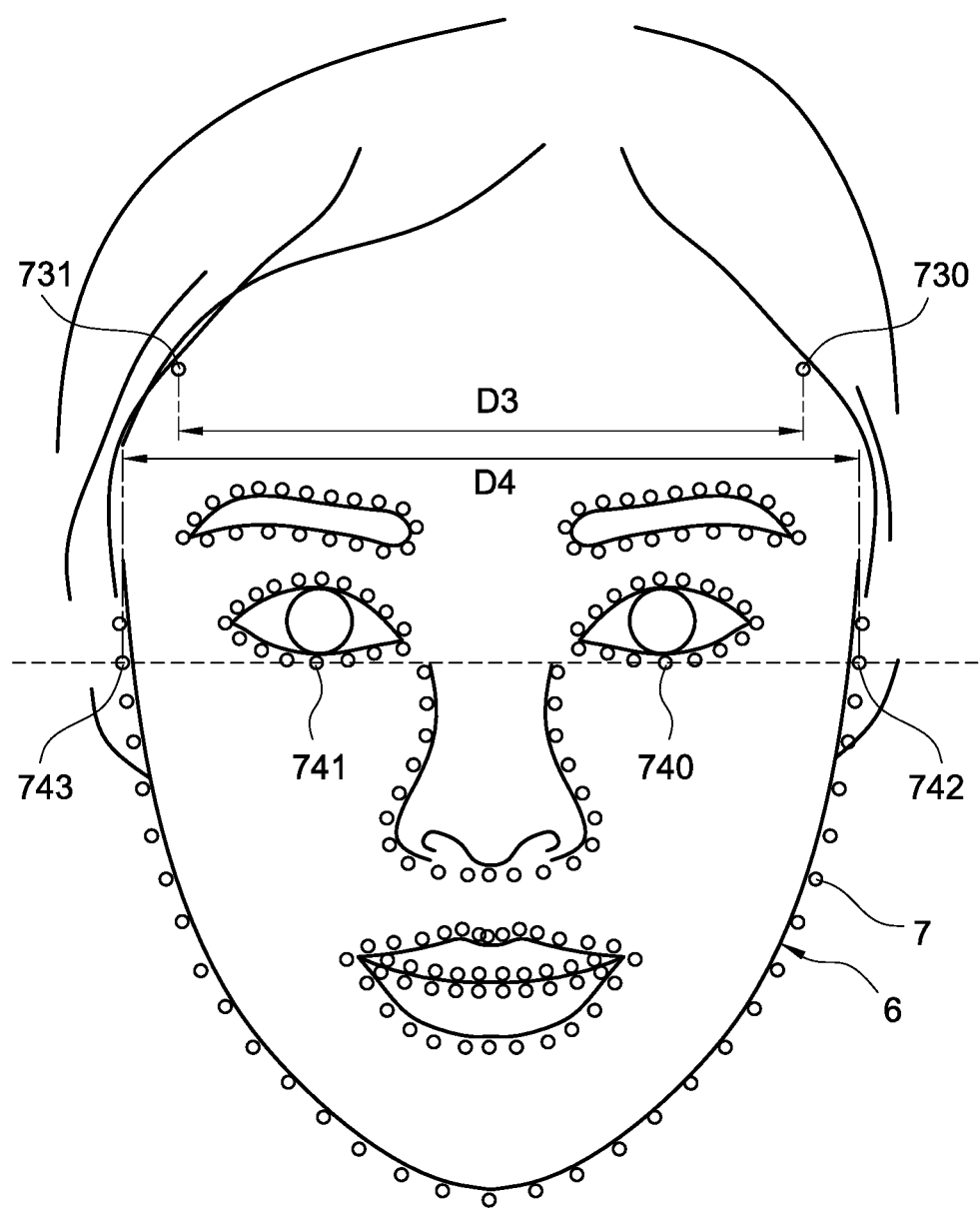
FIG. 13 schematically calculates a third face shape variable.

Also, the face analysis module 500 can analyze the face 6 to identify features of body parts in the image (e.g., a plurality of features 7 of FIGS. 11 to 13). The features 7 correspond to different features of the body parts (e.g., the eyes, the mouth, the lower lip and the eyebrows) of the user such as tips of the ends of the eyebrows, the protruded portions of the mouth, the lower lip, and the ends of the eyebrows.

The calculation module 501 calculates values (e.g., a first face shape variable, a second face shape variable and a third face shape variable) based on the features 7 as discussed later.

The face shape detection module 502 detects face shape in the current face 6 for confirming the original face shape in the face 6.

The evaluation module 503 evaluates deformation variables (e.g., deformation range, deformation type, and deformation magnitude) based on the face 6 and the target face shape.

The deformation main module 504 processes deformation on the face 6 to generate a simulated face image.

In an embodiment, the deformation main module 504 includes a first deformation module 506, a second deformation module 507, and a third deformation module 508 in which the first deformation module 506 adjusts the first face shape variable of the face 6, the second deformation module 507 adjusts the second face shape variable of the face 6, and the third deformation module 508 adjusts the third face shape variable of the face 6 respectively.

The output control module 505 may activate an output device (e.g., the display module 111) to output a simulated face image. In an embodiment, the output control module 505 comprises an auxiliary information generation module (not shown). Specifically, the auxiliary information generation module generates auxiliary information based on the face 6 and the simulated face image (e.g., similarity between the face 6 and the simulate face image, deformation range, deformation direction, and deformation magnitude) and sends the generated auxiliary information to the display module 111 for display. By utilizing the disclosed example, a user may clearly understand differences between his or her face shape and the target face shape, thereby increasing extent of user experience.

Figure 6:
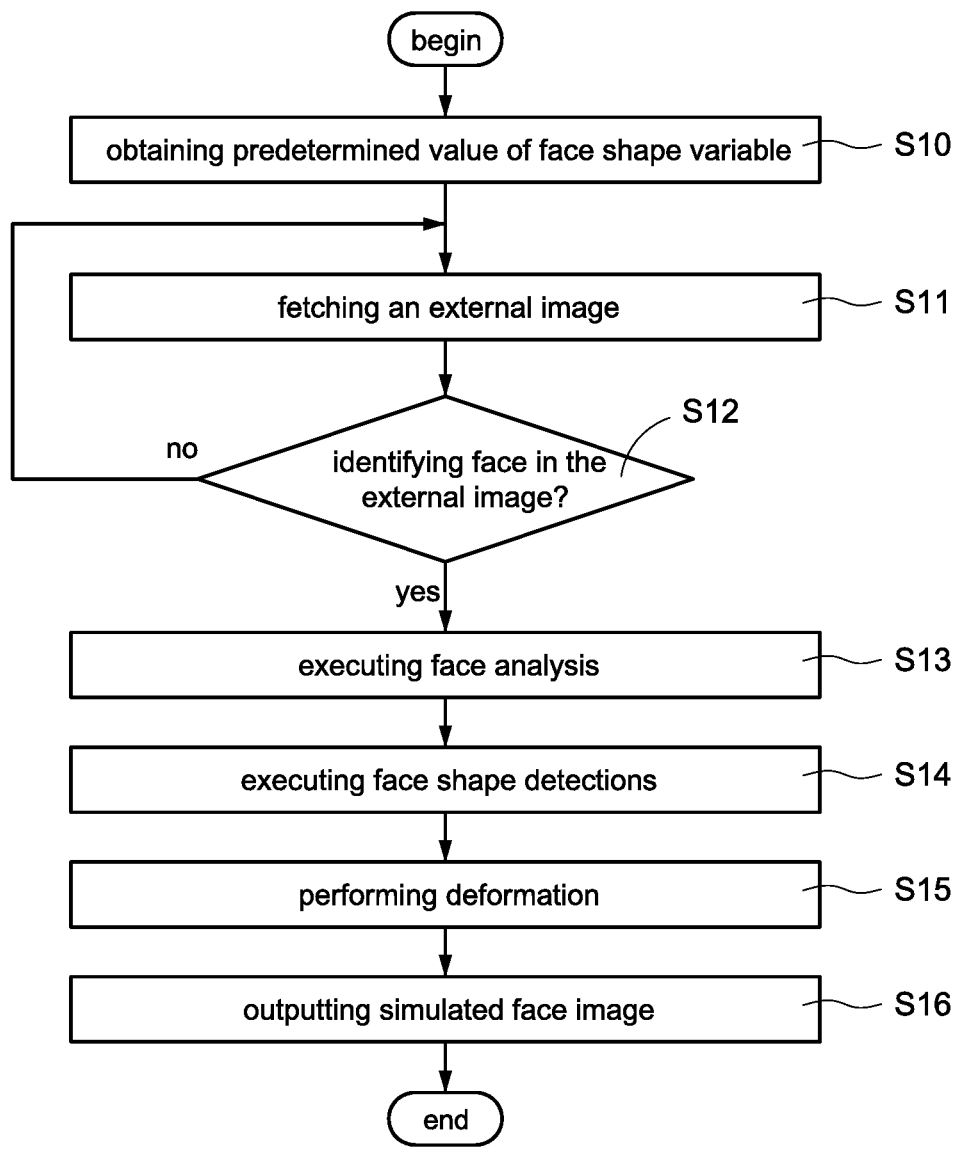
FIG. 6 is a flow chart illustrating a method of simulating face shape by using the body information analysis apparatus according to the disclosed example.

Referring to FIG. 6, it is a flow chart illustrating a method of simulating face shape by using the analysis apparatus 1 according to the disclosed example. Specifically, the analysis apparatus 1 activates the processing unit 10 to execute the above computer executable codes (e.g., modules 500 to 508) so that the face shape simulation method of the disclosed example can be effected.

The face shape simulation method comprises the following steps:

Step S10: The processing unit 10 of the analysis apparatus 1 reads a predetermined value of face shape variable from the memory 17 in which the face shape variable corresponds to a desired target face shape of a user.

Step S11: The processing unit 10 instructs the image fetching module 12 to take a high-resolution picture of a user and convert same into an external image.

In an embodiment, the processing unit 10 instructs the display module 111 to display the image, thereby giving an electronic mirror effect.

Step S12: The processing unit 10 executing face analysis to instruct the face analysis module 500 to identify the face in the image in order to determine whether the complete face 6 is included in the image. The face shape simulation method goes to step S13 if the processing unit 10 determines that the complete face 6 is included in the image. Otherwise, the face shape simulation method loops back step S11 to take a high-resolution picture of a user and convert same into an external image again.

Step S13: The processing unit 10 instructs the face analysis module 500 to identify location and range of the face 6 in the mage and cuts the face 6 from the image based on the location and range of the identified face 6.

Next, the processing unit 10 instructs the face analysis module 500 to analyze the face 6 in order to identify many parts (e.g., the eyebrow, the forehead, the mouth, the face contour and the eye) of the face 6.

In an embodiment, the face analysis is a feature analysis for identifying features of a specific part of the face 6.

Specifically, the features analysis is done by executing a feature landmark algorithm which analyzes the face 6 in order to identify features of a specific part (e.g., the eyebrow, the forehead, the mouth, the face contour and the eye) of the face 6 in a non-limiting manner. Further, the feature landmark algorithm is implemented by using Dlib library.

Referring to FIGS. 11, 12 and 13 in which FIG. 11 schematically calculates a first face shape variable, FIG. 12 schematically calculates a second face shape variable, and FIG. 13 schematically calculates a third face shape variable. The face analysis module 500 executes the feature landmark algorithm to analyze the face 6. The feature landmark algorithm is known in the art as a machine learning technique for analyzing the specific body parts in the face 6. Thus, features 7 of one or more body parts (e.g., the eyebrow, the forehead, the mouth, the face contour and the eye) can be identified in the face 6. The features 7 correspond to different features of the specific body parts.

Taking the eyebrow identification as an example, the features 7 correspond to one end, the peak and the other end of the eyebrow. Taking the mouth identification as an example, the features 7 correspond to the upper lip, the sides of the mouth and the lower lip. The number of the features 7 is 68, 198 or any of other numbers in a non-limiting manner.

Also, the feature landmark algorithm can be performed to mark the features 7 of the specific body parts in the face 6. As shown in FIGS. 11 to 13, the feature landmark algorithm can be performed to mark the features 7 in the face 6.

In an embodiment, the face analysis module 500 assigns numbers to the features 7 based on the body parts that the features 7 belong to. The disclosed example can identify locations of the body parts in the face 6 based on the numbers, shapes and sequences of the features 7. As a result, the body parts of the face 6 are identified.

Referring to FIG. 6 again, after step S13, the processing unit 10 instructs the face analysis module 500 to identify the plurality of the features 7 of the face 6. The step S14 is then executed. The processing unit 10 executes one or more face shape detections (e.g., oval face shape detection, square face shape detection, circular face shape detection, inversely triangular face shape detection, rhombic face shape detection, and rectangular face shape detection) to determine the face 6 of the user by activating the face detection module 502 based on the identified part of the face 6 and the features 7.

In an embodiment, the processing unit 10 instructs the calculation module 501 to calculate face shape variables required for processing face shape detection based on the face 6, and instructs the face shape detection module 502 to detect face shape based on the calculated face shape variables.

In an embodiment, the processing unit 10 sequentially executes the oval face shape detection, the square face shape detection, the circular face shape detection, the inversely triangular face shape detection, the rhombic face shape detection, and the rectangular face shape detection in order to determine whether the face 6 is an oval, square, circular, inverse triangular, rhombic, or rectangular face.

Step S15: The processing unit 10 instructs the deformation main module 504 to perform deformation on the face 6 based on the detected original face shape in order to generate a simulated face image which has a face shape variable complying with the predetermined value obtained by step S10 and a face shape complying with the target face shape.

In an embodiment, the processing unit 10 sets range of deformation based on the original face shape and the target face shape. The processing unit 10 further calculates deformation magnitude based on the predetermined value of the obtained face shape variable and the face shape variable complying with the face 6. The processing unit 10 still further performs deformation on the face 6 based on the set range of deformation in order to obtain the simulated face image.

Step 16: The processing unit 10 instructs the output control module 505 to send the simulated face image generated by step S15 to the display module 111 for display.

In another embodiment, the processing unit 10 instructs the wireless transmission module 16 to send the simulated face image to an external device (e.g., the electronic device 2 or the server 34).

Therefore, the disclosed example processes different deformations based on the original face shape of the user in order to generate a simulated face image complying with the target face shape of the user. As a result, the generated simulated face image is more natural.

Referring to FIGS. 11 to 13, first, second and third face shape variables calculated by the disclosed example are described. In an embodiment of the disclosed example, face shape detection or deformation is processed based on the face shape variable. Specifically, in processing face shape detection, the analysis apparatus 1 determines the original face shape of the face 6 based on the face shape variables of the face 6. In processing deformation, the analysis apparatus 1 changes a specific face shape variable of the face 6 by deforming the face 6. Thus, the specific face shape variable of the face 6 is defined as a predetermined value.

In an embodiment of the disclosed example, three face shape variables including a first face shape variable, a second face shape variable and a third face shape variable are defined.

Referring to FIG. 11, the first face shape variable is calculated. In calculating the first face shape variable, the calculation module 501 selects feature 700 at one end of one eyebrow or feature 702 at one end of the other eyebrow. In this example, the feature 700 at one end of one eyebrow is selected; and the calculation module 501 selects feature 701 at one end of the mouth or feature 703 at the other end of the mouth. In this example, the feature 703 at the other end of the mouth is selected. Also, the calculation module 501 calculates a vertical distance between the eyebrow (e.g., the feature 700 at one end of one eyebrow) and the mouth (e.g., the feature 703 at the other end of the mouth). The vertical distance is a first distance D1 in FIG. 11. Next, the calculation module 501 calculates a horizontal distance between any two features of the same height of the face contour. For example, features 711 and 712 having the same height as the feature 710 of the lower lip are selected. Specifically, the calculation module 501 selects any two features of the face contour having the same height and calculates a horizontal distance therebetween. The horizontal distance is a second distance D2 in FIG. 11. Finally, the calculation module 501 calculates a ratio of the first distance D1 to the second distance D2 and takes the ratio as the first face shape variable. For example, the first distance D1 is 500 pixels, the second distance D2 is 800 pixels, and the first face shape variable (D1/D2) is 5/8.

Referring to FIG. 12, the second face shape variable is calculated. In calculating the second face shape variable, the calculation module 501 selects a plurality of features. For example, adjacent features 720 to 722 of the face contour are selected. Next, the calculation module 501 calculates a cheek tangent L1 based on the selected features 720 to 722 of the face contour. Next, the calculation module 501 selects a plurality of features. For example, adjacent features 722 to 724 of the face contour are selected in which the selected features of the face contour can be partially or completely the same as the previously selected features. Further, the calculation module 501 calculates a cheek tangent L2 based on the selected features 722 to 724 of the face contour. Next, the calculation module 501 selects a plurality of features. For example, adjacent features 724 to 726 of the face contour are selected in which the selected features of the face contour can be partially or completely the same as the previously selected features. Further, the calculation module 501 calculates a cheek tangent L3 based on the selected features 724 to 726 of the face contour. Next, the calculation module 501 calculates a first cheek angle θ1 of the cheek tangent L1 with respect to the cheek tangent L2, and a second cheek angle θ2 of the cheek tangent L2 with respect to the cheek tangent L3. Finally, the calculation module 501 selects either the first cheek angle θ1 or the second cheek angle θ2 as the second face shape variable. For example, the cheek angle having a greater value is selected.

It is noted that two cheek angles are taken as an example for description in the embodiment in a non-limiting manner.

Referring to FIG. 13, the third face shape variable is calculated. In calculating the third face shape variable, the calculation module 501 selects features 730, 731 at two ends of the forehead respectively and calculates a horizontal distance between the features 700 and 731. The horizontal distance is a third distance D3 in FIG. 13. Next, the calculation module 501 selects any two features of the face contour having the same height. For example, features 740 and 741 on a lower edge of the two eyes, and features 742 and 743 of the face contour having the same height as the features 740 and 741 are selected. The calculation module 501 calculates a horizontal distance between the features 742 and 743. The horizontal distance is a fourth distance D4 in FIG. 13. Finally, the calculation module 501 calculates a ratio of the third distance D3 to the fourth distance D4 and takes the ratio as the third face shape variable. For example, the third distance D3 is 800 pixels, the fourth distance D4 is 1,000 pixels, and the third face shape variable (D3/D4) is 4/5.

In an embodiment, the feature 730 is directly above one end of one eye and the feature 731 is directly above one end of the other eye in a non-limiting manner.

Figure 7:
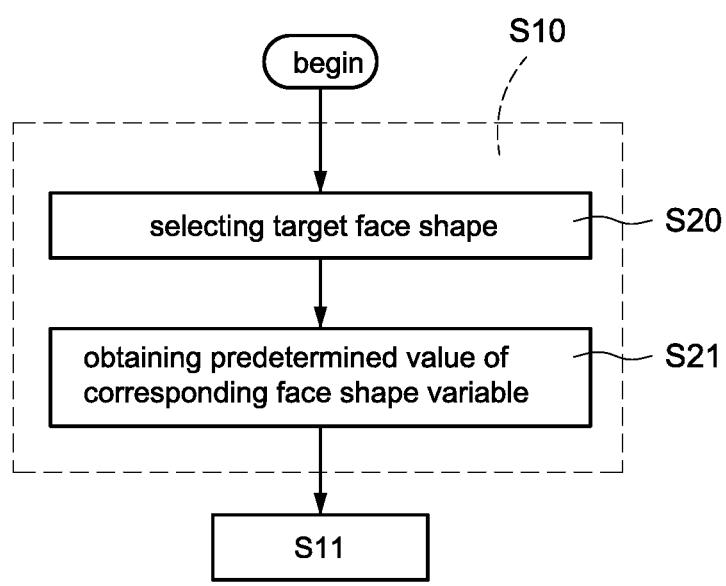
FIG. 7 is a flow chart illustrating details of step S10.

Referring to FIGS. 6 and 7 in which FIG. 7 is a flow chart illustrating details of step S10 of the disclosed example. In the embodiment, a user may operate the input interface 15 to select any face shape (e.g., oval face shape) as a target face shape. Also, in the embodiment, the memory 17 stores a plurality of predetermined face shape variables each corresponding to one of a plurality of different target face shapes. In comparison with the embodiment of FIG. 6, step S10 of the face shape simulation method of the disclosed example comprises the following steps:

Step S20: The processing unit 10 accepts an operation of selecting a target face shape via the input interface 15. The operation of selecting a target face shape aims to select one of a plurality of target face shapes (e.g., oval face shape, square face shape, circular face shape, inversely triangular face shape, rhombic face shape, and rectangular face shape).

Step S21: The processing unit 10 confirms the face shape variable of the selected target face shape and reads a predetermined face shape variable from the memory 17.

Thus, a user may set the desired face shape as a target face shape and see a simulated image based on the target face shape.

Figure 8A:
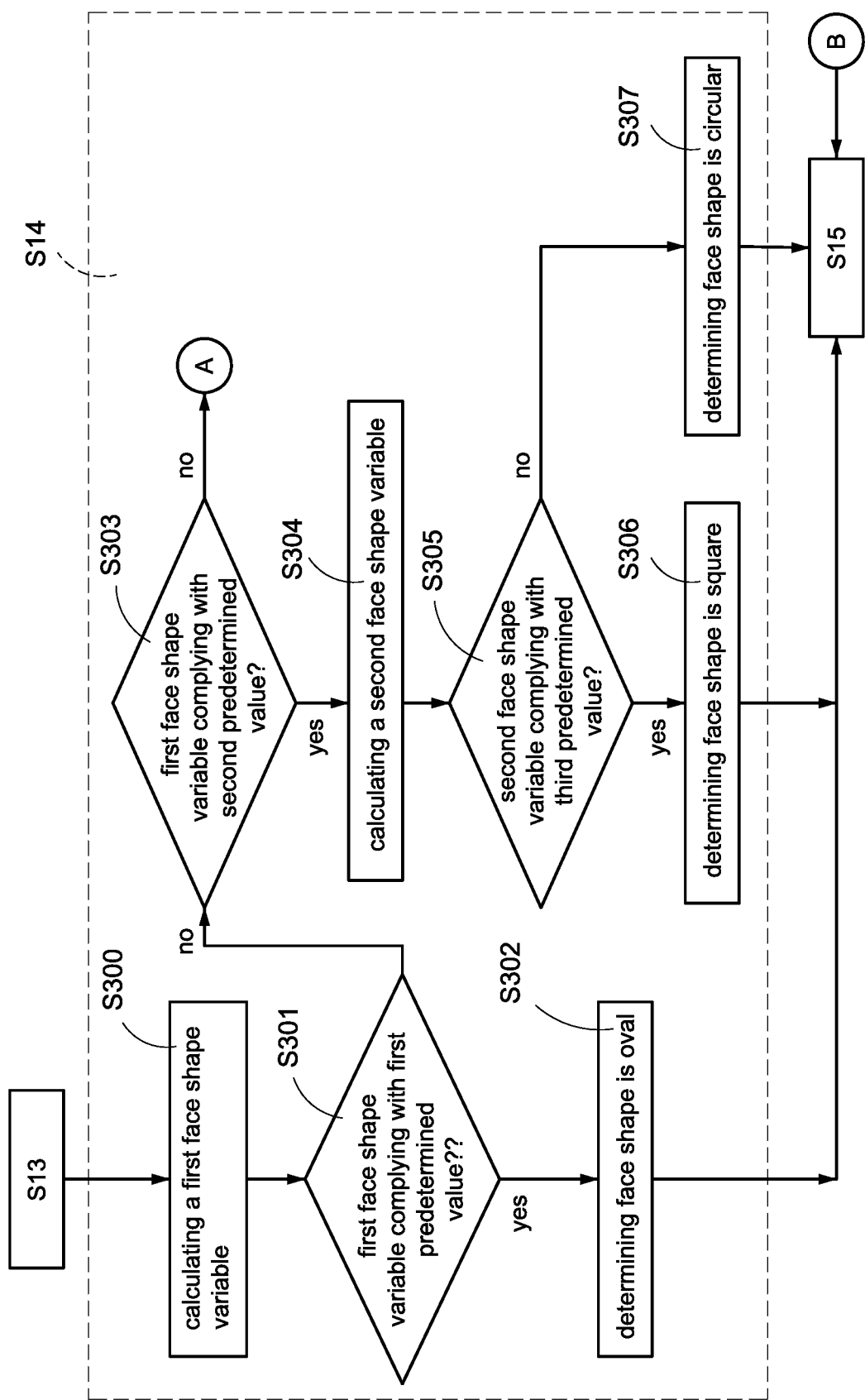
FIG. 8A is a partial flow chart illustrating details of step S14 according to the disclosed example.
Figure 8B:
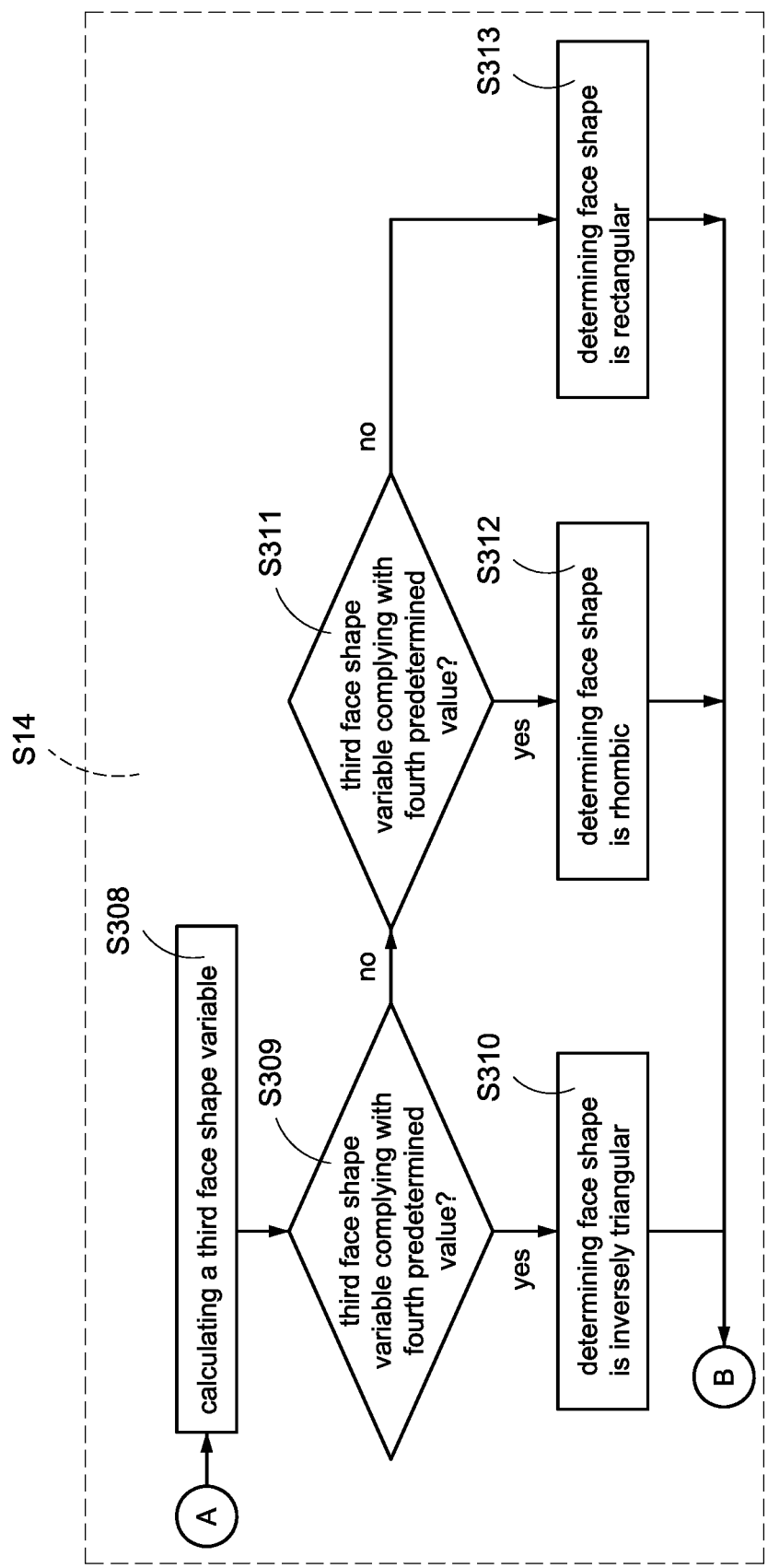
FIG. 8B is a partial flow chart illustrating details of step S14 according to the disclosed example.

Referring to FIGS. 6, 8A and 8B in which FIG. 8A is a partial flow chart illustrating details of step S14 according to the disclosed example, and FIG. 8B is a partial flow chart illustrating details of step S14 according to the disclosed example. In comparison with the embodiment of FIG. 6, step S14 of the face shape simulation method of the disclosed example comprises the following steps:

Step S300: The processing unit 10 instructs the calculation module 501 to calculate the first face shape variable of the face 6 in a taken picture of a user. Method of calculating the first face shape variable has been discussed with respect to the description of FIG. 11 and thus a detailed description thereof is omitted herein for the sake of brevity.

Step S301: The processing unit 10 instructs the face shape detection module 502 to read a first predetermined value (e.g., 1) of the first face shape variable from the memory 17 and compares same with the first face shape variable of the face 6 to determine whether they are equal or not.

The method proceeds to step S302 if the processing unit 10 determines that the first predetermined value of the first face shape variable is equal to the first face shape variable of the face 6. Otherwise, the method proceeds to step S303.

Step S302: The processing unit 10 determines the face 6 is oval via the face shape detection module 502. Next, the method proceeds to step S15.

The method goes to step S303 after the processing unit 10 determines that the first predetermined value of the first face shape variable is not equal to the first face shape variable of the face 6.

Step S303: The processing unit 10 instructs the face shape detection module 502 to read a second predetermined value (e.g., 0.65) of the second face shape variable from the memory 17 and compares same with the first face shape variable of the face 6 to determine whether they are equal or not.

In an embodiment, the first predetermined value is in the range between 0.9 and 1.1 and the second predetermined value is in the range between 0.6 and 0.7 respectively. The processing unit 10 determines that the first face shape variable of the face 6 complies with the first predetermined value if the first face shape variable of the face 6 is in the range of the first predetermined value.

The method proceeds to step S304 if the processing unit 10 determines that the first face shape variable of the face 6 complies with the second predetermined value. Otherwise, the method proceeds to step S308.

Step S304: The processing unit 10 instructs the calculation module 501 to calculate the second face shape variable of the face 6 in a taken picture of a user. Method of calculating the second face shape variable has been discussed with respect to the description of FIG. 12 and thus a detailed description thereof is omitted herein for the sake of brevity.

Step S305: The processing unit 10 instructs the face shape detection module 502 to read a third predetermined value (e.g., 5°) of the second face shape variable from the memory 17 and compares same with the second face shape variable of the face 6 to determine whether they are equal or not.

In an embodiment, the processing unit 10 determines that the second face shape variable of the face 6 complies with the third predetermined value if the second face shape variable of the face 6 is greater than the third predetermined value or the processing unit 10 determines that the second face shape variable of the face 6 does not comply with the third predetermined value if the second face shape variable of the face 6 is not greater than the third predetermined value.

In an embodiment, the third predetermined value is in the range between 3° and 5°. The processing unit 10 determines that the second face shape variable of the face 6 complies with the third predetermined value if the second face shape variable of the face 6 is in the range of the third predetermined value.

The method proceeds to step S306 if the processing unit 10 determines that the second face shape variable of the face 6 complies with the third predetermined value. Otherwise, the method proceeds to step S307.

Step S306: The processing unit 10 determines the face 6 is square via the face shape detection module 502. The method proceeds to step S15.

Step S307: The processing unit 10 determines the face 6 is rectangular via the face shape detection module 502. The method proceeds to step S15.

The method proceeds to step S308 if the processing unit 10 determines that the first face shape variable of the face 6 does not comply with the second predetermined value in step S303.

Step S308: The processing unit 10 instructs the calculation module 501 to calculate the third face shape variable of the face 6 in a taken picture of a user. Method of calculating the third face shape variable has been discussed with respect to the description of FIG. 13 and thus a detailed description thereof is omitted herein for the sake of brevity.

Step S309: The processing unit 10 instructs the face shape detection module 502 to read a fourth predetermined value (e.g., 1) of the third face shape variable from the memory 17 and compares same with the third face shape variable of the face 6 to determine whether they are equal or not.

The method proceeds to step S311 if the processing unit 10 determines that the fourth predetermined value of the third face shape variable is equal to the third face shape variable of the face 6. Otherwise, the method proceeds to step S311.

Step S310: The processing unit 10 determines the face 6 is an inverse triangle via the face shape detection module 502. Next, the method proceeds to step S15.

The method goes to step S311 after the processing unit 10 determines that the fourth predetermined value of the third face shape variable is not equal to the third face shape variable of the face 6.

Step S311: The processing unit 10 instructs the face shape detection module 502 to read a fifth predetermined value (e.g., ⅔ or 0.66) of the third face shape variable from the memory 17 and compares same with the third face shape variable of the face 6 to determine whether they are equal or not.

In an embodiment, the fourth predetermined value is in the range between 0.9 and 1.1 and the fifth predetermined value is in the range between 0.65 and 0.67 respectively. The processing unit 10 determines that the third face shape variable of the face 6 complies with the fifth predetermined value if the third face shape variable of the face 6 is in the range of the fifth predetermined value.

The method proceeds to step S312 if the processing unit 10 determines that the third face shape variable of the face 6 complies with the fifth predetermined value. Otherwise, the method proceeds to step S313.

Step S312: The processing unit 10 determines the face 6 is rhombic via the face shape detection module 502. The method proceeds to step S15.

Step S313: The processing unit 10 determines the face 6 is rectangular via the face shape detection module 502. The method proceeds to step S15.

It is envisaged that the original face shape of the face 6 can be determined by the disclosed example.

Figure 9:
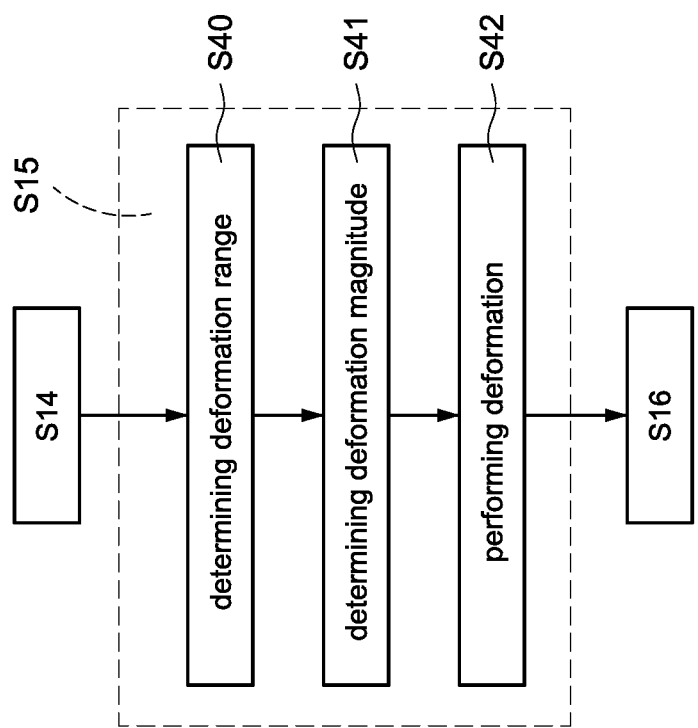
FIG. 9 is a flow chart illustrating details of step S15.

Referring to FIGS. 6 and 9 in which FIG. 9 is a flow chart illustrating details of step S15. In comparison with the embodiment of FIG. 6, step S15 of the face shape simulation method of the disclosed example comprises the following steps:

Step S40: The processing unit 10 determines a deformation range of the face 6 based on the target face shape of a user and the original face shape of the face 6 which is detected by the evaluation module 503 in step S13.

In an embodiment, the processing unit 10 sets the deformation range of the face 6 based on a geometric difference between the original face shape and the target face shape and further sets a deformation type (e.g., horizontal contraction, horizontal expansion, vertical contraction, vertical expansion, increase of cheek angle, or decrease of cheek angle).

For example, if the original face shape of the face 6 is square and the target face shape is circular, the processing unit 10 sets the lower contour of the face 6 as the deformation range. Thereafter, in processing the deformation the cheek angle of the face 6 is decreased to modify the original square face shape of the face 6 as circular.

In another example, if the original face shape of the face 6 is oval and the target face shape is rhombic, the processing unit 10 sets the upper contour (e.g., forehead) and the lower contour of the face 6 as the deformation range. Thereafter, in processing the deformation both the distance between two sides of the upper contour of the face 6 and the distance between two sides of the lower contour of the face 6 are decreased to modify the original oval face shape of the face 6 as rhombic.

Step S41: The processing unit 10 determines the deformation range based on the face shape variable (e.g., the first face shape variable, the second face shape variable, or the third face shape variable) of the face 6 and the predetermined value of the same face shape variable via the evaluation module 503.

In an embodiment, the processing unit 10 determines the deformation range based on a difference between the face shape variable and the predetermined value.

Step S42: The processing unit 10 determines the deformation type based on the deformation range via the deformation main module 504 in order to process the deformation of the deformation range of the face 6. Thereafter, the face shape variable of the face 6 can be adjusted to comply with the predetermined value. Finally, the adjusted face 6 is taken as a simulated face image.

In an embodiment, the selects at least one of the first deformation module 506, the second deformation module 507, and the third deformation module 508 based on the current target face shape to adjust face shape variable of the target face shape corresponding to the face 6.

For example, with respect to the target face shape being oval face shape, the processing unit 10 adjusts the first face shape variable of the face 6 to be the first predetermined value via the first deformation module 506; with respect to the target face shape being square face shape, the processing unit 10 adjusts the first face shape variable of the face 6 to be the second predetermined value via the first deformation module 506, and adjusts the second face shape variable of the face 6 to be greater than the third predetermined value via the second deformation module 507; with respect to the target face shape being circular face shape, the processing unit 10 adjusts the first face shape variable of the face 6 to be the second predetermined value via the first deformation module 506, and adjusts the second face shape variable of the face 6 to be not greater than the third predetermined value via the second deformation module 507; with respect to the target face shape being inversely triangular face shape, the processing unit 10 adjusts the third face shape variable of the face 6 to be the fourth predetermined value via the third deformation module 508; and with respect to the target face shape being rhombic face shape, the processing unit 10 adjusts the third face shape variable of the face 6 to be the fifth predetermined value via the third deformation module 508.

It is envisaged that the disclosed example calculates variables related to deformation and processes the deformation based on the original face shape of the face 6, thereby generating a more natural simulated face image.

Figure 10:
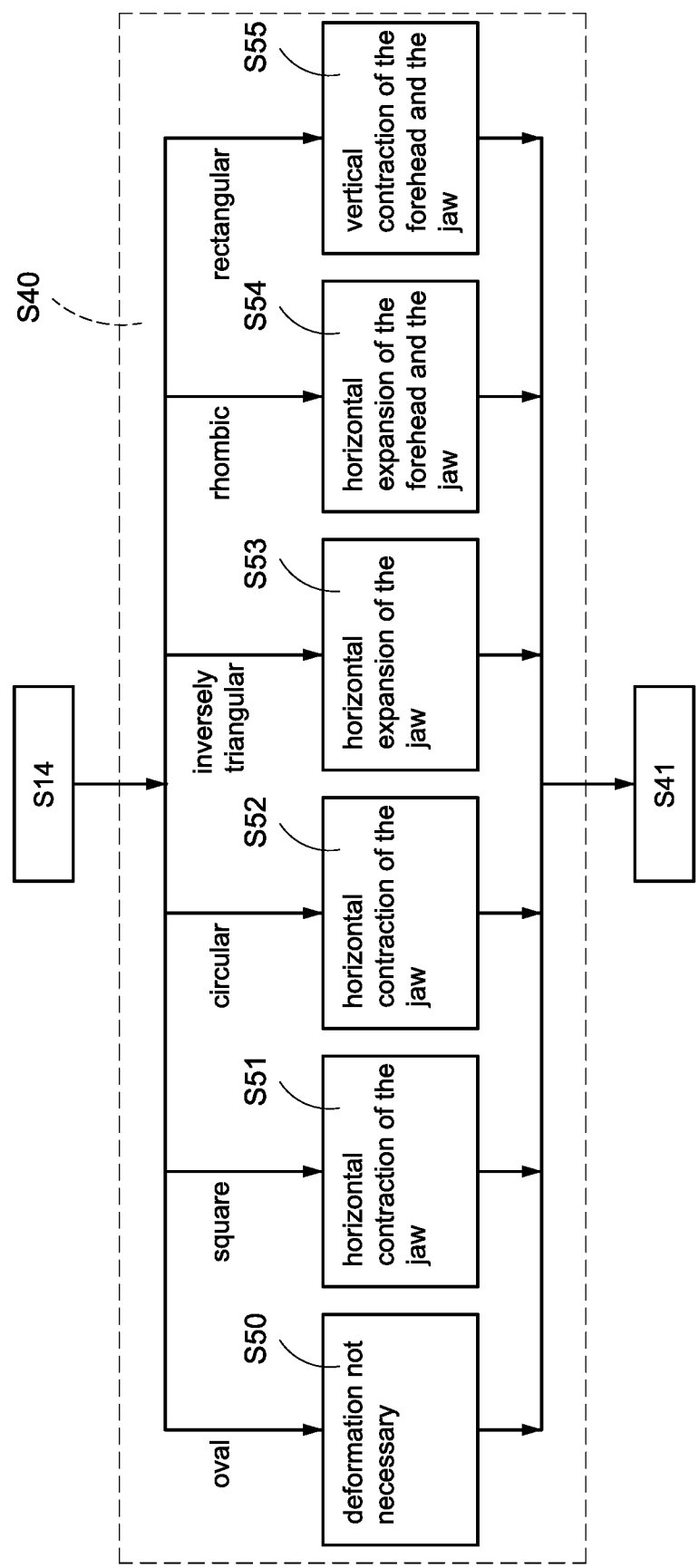
FIG. 10 is a flow chart illustrating details of step S40.
Figure 14A:
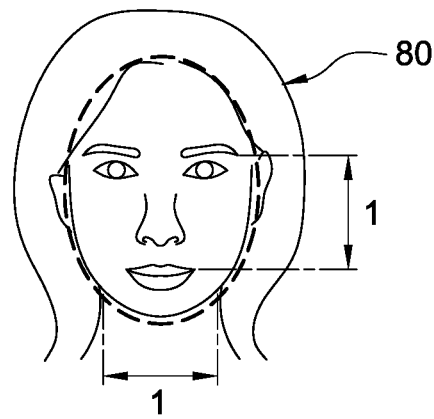
FIG. 14A schematically depict a simulated face image of the disclosed example.
Figure 14B:
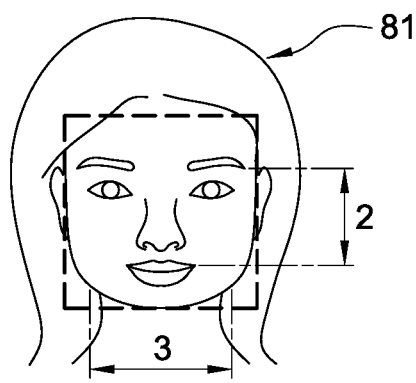
FIG. 14B schematically depicts a first original face shape of the disclosed example.
Figure 14C:
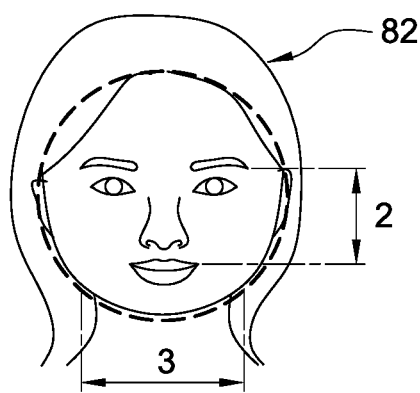
FIG. 14C schematically depicts a second original face shape of the disclosed example.
Figure 14D:
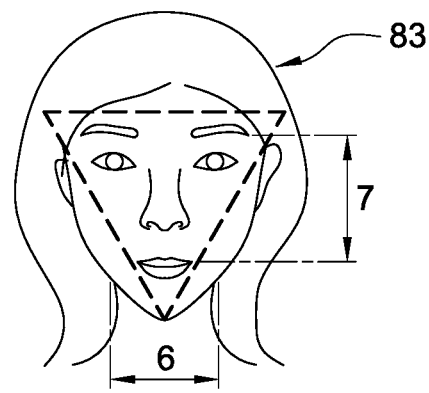
FIG. 14D schematically depicts a third original face shape of the disclosed example.
Figure 14E:
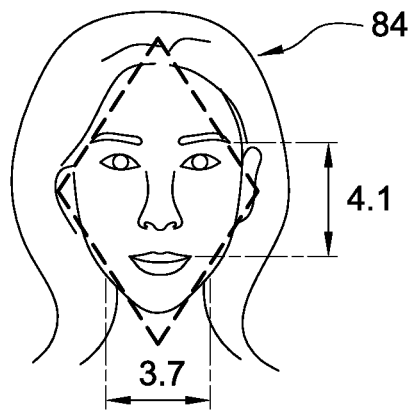
FIG. 14E schematically depicts a fourth original face shape of the disclosed example.
Figure 14F:
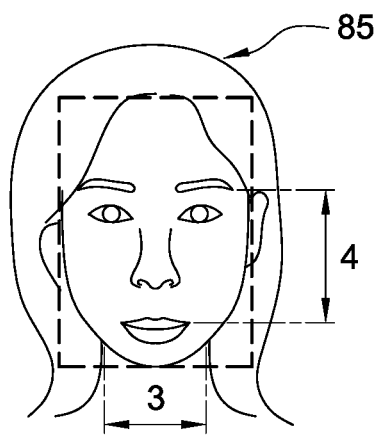
FIG. 14F schematically depicts a fifth original face shape of the disclosed example.

Referring to FIGS. 6, 9, 10 and 14A to 14F in which FIG. 10 is a flow chart illustrating details of step S40, FIG. 14A schematically depict a simulated face image of the disclosed example, FIG. 14B schematically depicts a first original face shape of the disclosed example, FIG. 14C schematically depicts a second original face shape of the disclosed example, FIG. 14D schematically depicts a third original face shape of the disclosed example, FIG. 14E schematically depicts a fourth original face shape of the disclosed example, and FIG. 14F schematically depicts a fifth original face shape of the disclosed example.

The face shape simulation method of the embodiment can set different deformation variables (e.g., deformation range and deformation type) based on different original face shapes. In the embodiment, the target face shape is oval. That is, in a subsequent deformation process the first face shape variable of the face 6 is to be adjusted and the predetermined value of the first face shape variable is 1. After performing deformation on faces of different shapes (e.g., faces 81 to 85 shown in FIGS. 14B to 14F) by the embodiment, a simulated face image having an oval face shape (e.g., the simulated face image 80 of FIG. 14) can be generated.

It is noted that while for illustration purpose the target face shape is oval in the embodiment, those skilled in the art can understand that the disclosed example can be implemented in other target face shapes by referring to the disclosure.

In comparison with the embodiment of FIG. 6, step S40 of the face shape simulation method of the embodiment comprises the following steps:

Step S50: After determining that the original face shape of the face 6 is oval, the processing unit 10 instructs the output control module 505 to output a message of "deformation not necessary" to a user since the original face shape of the face 6 is the target face shape. Also, the processing unit 10 does not set any variable parameters and does not process any deformation.

Step S51: After determining that the original face shape of the face 6 is square, the processing unit 10 instructs the evaluation module 503 to set the deformation range to be the jaw of the face 6 and set the deformation type to be horizontal contraction.

For example, as shown in FIG. 14B, the shape of the face 81 is square and the first face shape variable of the face 81 is ⅔. Thus, the processing unit 10 determines that width of the jaw of the face 81 exceeds a predetermined width. And in turn, the processing unit 10 performs a horizontal contraction of the face 81 to adjust the first face shape variable of the face 81 to be 1 corresponding to the set deformation range and deformation type.

Step S52: After determining that the original face shape of the face 6 is circular, the processing unit 10 instructs the evaluation module 503 to set the deformation range to be the jaw of the face 6 and set the deformation type to be horizontal contraction.

For example, as shown in FIG. 14C, the shape of the face 82 is circular and the first face shape variable of the face 82 is ⅔. Thus, the processing unit 10 determines that width of the jaw of the face 82 exceeds a predetermined width. And in turn, the processing unit 10 performs a horizontal contraction of the face 82 to adjust the first face shape variable of the face 82 to be 1 corresponding to the set deformation range and deformation type.

Step S53: After determining that the original face shape of the face 6 is an inverse triangle, the processing unit 10 instructs the evaluation module 503 to set the deformation range to be the jaw of the face 6 and set the deformation type to be horizontal expansion.

For example, as shown in FIG. 14D, the shape of the face 83 is an inverse triangle and the first face shape variable of the face 83 is 7/6. Thus, the processing unit 10 determines that width of the jaw of the face 83 is less than a predetermined width. And in turn, the processing unit 10 performs a horizontal expansion of the face 83 to adjust the first face shape variable of the face 83 to be 1 corresponding to the set deformation range and deformation type.

Step S54: After determining that the original face shape of the face 6 is rhombic, the processing unit 10 instructs the evaluation module 503 to set the deformation range to be both the forehead and the jaw of the face 6 and set the deformation type to be horizontal expansion. For example, as shown in FIG. 14E, the shape of the face 84 is rhombic and the first face shape variable of the face 84 is $$\frac{4.1}{3.7}.$$

Thus, the processing unit 10 determines that widths of both the jaw and the forehead of the face 84 are less than a predetermined width. And in turn, the processing unit 10 performs a horizontal expansion of the face 84 to adjust the first face shape variable of the face 84 to be 1 corresponding to the set deformation range and deformation type.

Step S55: After determining that the original face shape of the face 6 is rectangular, the processing unit 10 instructs the evaluation module 503 to set the deformation range to be both the forehead and the jaw of the face 6 and set the deformation type to be vertical contraction.

For example, as shown in FIG. 14F, the shape of the face 85 is rectangular and the first face shape variable of the face 85 is 4/3. Thus, the processing unit 10 determines that widths of both the jaw and the forehead of the face 85 are less than a predetermined width, and the vertical distance of the face 82 exceeds a predetermined value. And in turn, the processing unit 10 performs a horizontal contraction of the face 85 to adjust the first face shape variable of the face 85 to be 1 corresponding to the set deformation range and deformation type.

Next, the processing unit 10 performs step S41.

It is envisaged that the disclosed example can generate a simulated face image corresponding to the target face shape based on one of a plurality of different original face shape of the face.

While the disclosed example has been described in terms of preferred embodiments, those skilled in the art will recognize that the disclosed example can be practiced with modifications within the spirit and scope of the appended claims.

What is claimed is:

1. A body information analysis apparatus, comprising:
   an image fetching module for recording an external image;
   a display module;
   a memory for storing a predetermined value of a face shape variable wherein the face shape variable corresponds to a target face shape; and
   a processing unit electrically connected to the image fetching module, the display module, and the memory, the processing unit including:
   a face analysis module for identifying a face in the external image and positioning a plurality of parts of the face;
   a face shape detection module for determining an original face shape of the face based on the plurality of parts of the face;
   an evaluation module for determining a deformation magnitude based on the face shape variable of the face and the predetermined value of the face shape variable, and a deformation range based on the original face shape of the face and the target face shape;
   a deformation main module for performing deformation on the deformation range of the face to generate a simulated face image based on the deformation magnitude of the face wherein a face shape variable of the simulated face image complies with the predetermined value; and
   an output control module for controlling the display module to show the simulated face image.

2. The body information analysis apparatus as claimed in claim 1, further comprising an input interface electrically connected to the processing unit, the input interface being configured to receive an operation of selecting one of a plurality of target face shapes;
   wherein the memory stores the predetermined values of the face shape variables, the face shape variables correspond to the target face shapes respectively; and
   wherein the deformation main module performs the deformation to adjust the face shape variable of the face to be the predetermined value, the face shape variable corresponds to the selected target face shape.

3. The body information analysis apparatus as claimed in claim 1, wherein the processing unit further comprises a calculation module for calculating a first face shape variable of the face based on both a vertical distance between the eyebrow and the mouth of the face and a horizontal distance between two sides of the cheeks of the face, calculating a cheek angle of a contour of the face and taking the cheek angle as a second face shape variable of the face, and calculating a third face shape variable of the face based on both a horizontal distance between two sides of the forehead of the face and a horizontal distance between two sides of the contour of the face.

4. The body information analysis apparatus as claimed in claim 3, wherein the face shape detection module determines that the face is oval after determining the first face shape variable of the face complying with a first predetermined value, determines that the face is square after determining the first face shape variable of the face complying with a second predetermined value and the second face shape variable of the face is greater than a third predetermined value, determines that the face is circular after determining the first face shape variable of the face complying with the second predetermined value and the second face shape variable of the face is not greater than the third predetermined value, determines that the face is an inverse triangle after determining the third face shape variable of the face complying with a fourth predetermined value, determines that the face is rhombic after determining the third face shape variable of the face complying with a fifth predetermined value, and determines that the face is rectangular after determining the third face shape variable of the face not complying with both the fourth predetermined value and the fifth predetermined value.

5. The body information analysis apparatus as claimed in claim 4, wherein the deformation main module further comprises:
   a first deformation module for adjusting the first face shape variable of the face to be either the first predetermined value when the target face shape is oval or the second predetermined value when the target face shape is square or circular;
   a second deformation module for adjusting the second face shape variable of the face to be either greater than the third predetermined value when the target face shape is square or not greater than the third predetermined value when the target face shape is circular; and
   a third deformation module for adjusting the third face shape variable of the face to be either the fourth predetermined value when the target face shape is inversely triangular or the fifth predetermined value when the target face shape is rhombic.

6. The body information analysis apparatus as claimed in claim 1, wherein:
   the evaluation module sets the deformation range as the jaw of the face and sets a deformation type as horizontal contraction when the target face shape is oval and the original face shape of the face is square, circular or inversely triangular;
   the evaluation module sets the deformation range as the jaw of the face and sets a deformation type as horizontal expansion when the target face shape is oval and the original face shape of the face is inversely triangular;
   the evaluation module sets the deformation range as both the jaw and the forehead of the face and sets a deformation type as horizontal expansion when the target face shape is oval and the original face shape of the face is rhombic; and
   the evaluation module sets the deformation range as both the jaw and the forehead of the face and sets a deformation type as vertical contraction when the target face shape is oval and the original face shape of the face is rectangular.

7. The body information analysis apparatus as claimed in claim 6, wherein the deformation main module performs deformation on the deformation range of the face based on both the deformation magnitude and the deformation type to adjust the face shape variable of the face to be the predetermined value.

8. A method of simulating face shape by using a body information analysis apparatus, comprising steps of:
   (a) reading a predetermined value of a face shape variable from a memory of the body information analysis apparatus wherein the face shape variable corresponds to a target face shape;
   (b) causing an image fetching module to fetch an external image;
   (c) causing a processing unit of the body information analysis apparatus to identify a face in the external image and position a plurality of parts of the face;

(d) determining an original face shape of the face based on the plurality of parts thereof;
(e) determining a deformation magnitude based on both the face shape variable of the face and the predetermined value of the face shape variable of the face;
(f) determining a deformation range of the face based on both the original face shape and the target face shape, wherein the deformation range is set as the jaw of the face and the deformation type is set as the horizontal contraction when the target face shape is oval and the original face shape is square, the deformation range is set as the jaw of the face and the deformation type is set as the horizontal expansion when the target face shape is oval and the original face shape is inversely triangular, the deformation range is set as the jaw and the forehead of the face and the deformation type is set as the horizontal expansion when the target face shape is oval and the original face shape is rhombic, and the deformation range is set as the jaw and the forehead of the face and the deformation type is set as the vertical contraction when the target face shape is oval and the original face shape is rectangular;
(g) performing deformation on the deformation range of the face based on the deformation magnitude thereof to generate a simulated face image wherein a face shape variable of the simulate face image complies with the predetermined value; and
(h) outputting the simulated face image.

9. The method as claimed in claim 8, wherein step (a) comprises the sub-steps of:
(a1) receiving an operation of selecting one of the target face shapes via an input interface of the body information analysis apparatus; and
(a2) obtaining the predetermined value of the face shape variable wherein the face shape variable corresponds to the selected one of the target face shapes.

10. The method as claimed in claim 8, wherein step (d) comprises the sub-steps of:
(d1) calculating a first face shape variable of the face based on both a vertical distance between the eyebrow and the mouth of the face and a horizontal distance between two sides of a contour of the face;
(d2) determining the face to be oval after determining the first face shape variable of the face complying with the first predetermined value;
(d3) calculating a cheek angle of the contour of the face and taking same as a second face shape variable of the face after determining the first face shape variable of the face complying with a second predetermined value;
(d4) determining the face to be square after determining the first face shape variable of the face complying with a second predetermined value and the second face shape variable of the face greater than a third predetermined value;
(d5) determining the face to be circular after determining the first face shape variable of the face complying with the second predetermined value and the second face shape variable of the face not greater than the third predetermined value;
(d6) calculating a third face shape variable of the face based on both a horizontal distance between two sides of the forehead and a horizontal distance between two sides of the contour of the face;
(d7) determining the face to be inversely triangular after determining the third face shape variable of the face complying with a fourth predetermined value;
(d8) determining the face to be rhombic after determining the third face shape variable of the face complying with a fifth predetermined value; and
(d9) determining the face to be rectangular after determining the third face shape variable of the face not complying with both the fourth predetermined value and the fifth predetermined value.

11. The method as claimed in claim 10, wherein step (g):
adjusts the first face shape variable of the face to be the first predetermined value when the target face shape is oval;
adjusts both the first face shape variable of the face to be the second predetermined value and the second face shape variable of the face greater than the third predetermined value when the target face shape is square;
adjusts both the first face shape variable of the face to be the second predetermined value and the second face shape variable of the face not greater than the third predetermined value when the target face shape is circular;
adjusts the third face shape variable of the face to be the fourth predetermined value when the target face shape is inversely triangular; and
adjusts the third face shape variable of the face to be the fifth predetermined value when the target face shape is rhombic.

12. The method as claimed in claim 8, wherein in step (g) performing deformation on the deformation range of the face based on both the deformation magnitude and the deformation type to adjust the face shape variable of the face to be the predetermined value.

* * * * *